Aug. 7, 1945.  G. L. McFARLAND, JR  2,381,764
APPARATUS FOR CHARGING AND SEALING TUBULAR CONTAINERS
Filed May 18, 1943
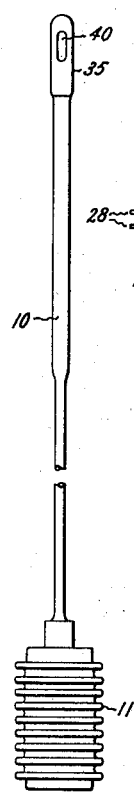
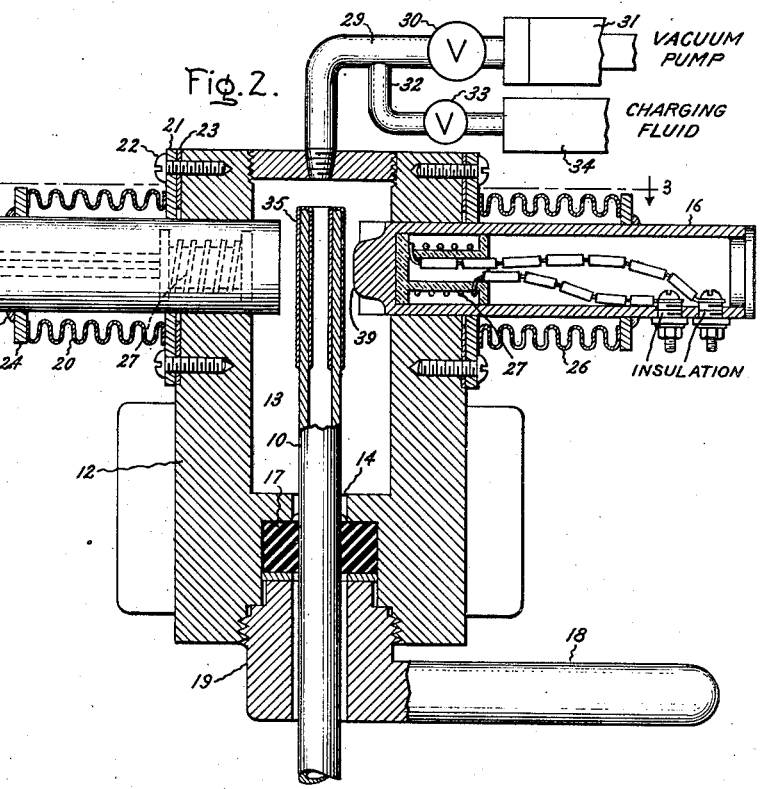
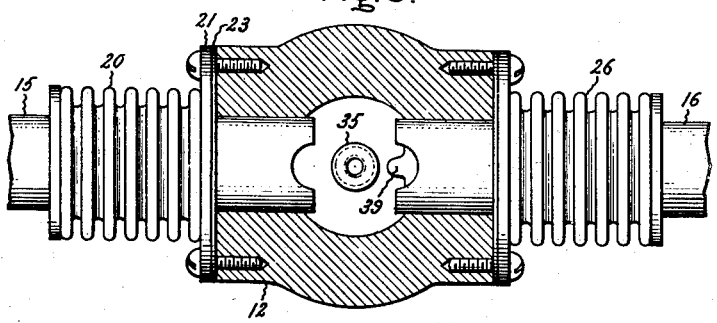
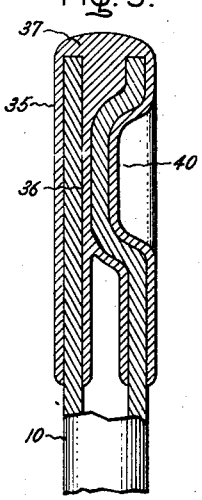
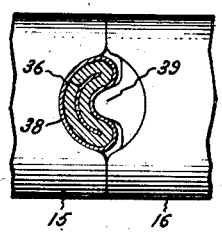
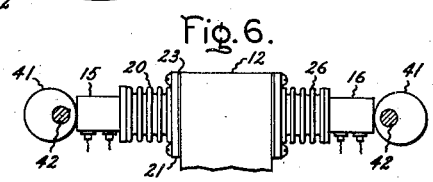
Inventor:
George L. McFarland Jr.,
by Harry E. Dunham
His Attorney.

Patented Aug. 7, 1945

2,381,764

UNITED STATES PATENT OFFICE 2,381,764

APPARATUS FOR CHARGING AND SEALING TUBULAR CONTAINERS

George L. McFarland, Jr., Scotia, N. Y., assignor to General Electric Company, a corporation of New York Application May 18, 1943, Serial No. 487,539

5 Claims. (Cl. 226—20.6)

My invention relates to an apparatus for charging and sealing tubular containers, more particularly to an apparatus for charging and sealing temperature responsive devices of the fluid filled bellows or expansible diaphragm type provided with a tube through which the air is exhausted and the charge of fluid is admitted, the tube being thereafter sealed, and has for its object a simple and reliable means for sealing the tube.

More specifically, my invention has for its object a more effective seal for the end of the tube, together with apparatus for making the seal without the waste of a substantial length of the tubing.

My invention is applicable to the production of bellows type temperature responsive devices in large quantities, such as used in the temperature responsive control of electric refrigerators. In accordance with the prior practice, the tube has been sealed by inserting its end in a sealed chamber, then exhausting the air from the chamber, admitting the charging fluid, and then compressing the tube at a point outside of the chamber to seal it. The tube is then removed from the apparatus and the length of tubing outside of the seal is cut off and the sealed end then dipped in solder bath. This method has two outstanding disadvantages: first, the length of tubing that is cut off is wasted; and second, the dipping of the sealed end in solder does not in many cases form a perfect seal because penetration of the solder between the compressed walls is prevented by the higher than atmospheric pressure of the fluid inside. Many of the devices fail in service because of imperfections in the seal.

In carrying out my invention, I first apply a layer of solder to the inner and outer walls of the tube at its end, and then insert the end of the tube in an evacuating and charging device provided with heated clamping members for pressing the soldered end walls together after the tube has been evacuated and charged and, at the same time, liquefying the solder so as to form a perfect soldered seal. At this time the fluid pressure is balanced on the two sides of the seal so that a good seal is formed.

For a more complete understanding of my invention, reference should be had to the accompanying drawing, Fig. 1 of which is an elevation view of a tube and bellows type temperature responsive device, such as used in domestic electric refrigerators, manufactured in accordance with my invention; Fig. 2 is a view mainly in section of the evacuating, charging and sealing apparatus embodying my invention; Fig. 3 is a view partly in section taken along the line 3—3 of Fig. 2 looking in the direction of the arrows; Fig. 4 is an enlarged detail view showing the compression of the end of the tube by the clamping members; Fig. 5 is an enlarged view in section showing the seal made in accordance with my invention; while Fig. 6 is a fragmentary view on a reduced scale showing the apparatus of Figs. 2 and 3 with cam operating means.

Referring to the drawing, I have shown my invention in one form as applied to the sealing of the upper end, as seen in the drawing, of a tube 10 having its lower end connected with an expansible bellows operating device 11. The charging and sealing device comprises walls 12 forming a chamber 13 having an opening 14 in its lower end, as seen in the drawing, through which the tube 10 is inserted a predetermined distance so that its upper end is between the two jaws of compression or clamping members 15 and 16. The opening 14 is effectively sealed by a rubber bushing 17 which may be compressed to form a fluid-tight seal around the tube by turning a handle 18 attached to a compression hub 19 in screw threaded relation with the enlarged bore around the opening 14. Thus, after the tube is inserted, the handle 18 is turned to move the hub 19 into this bore against the rubber bushing 17 which is compressed tightly around the tube.

The clamping members 15 and 16, which are in alinement with each other and at right angles with the tube 10, are mounted loosely in apertures in the side walls of the chamber so that they can be moved inward together to compress the end walls of the tube. The clamping member 15 is sealed in the wall of the tube by means of a compressible spring bellows member 20 surrounding it having its inner end secured to a bushing 21 surrounding the clamping member 15 and secured tightly to the wall of the chamber by suitable screws 22 and a gasket 23. The outer or left-hand end of this spring bellows 20 is tightly secured to a ring 24 which in turn is secured to the clamping member 15 by a welded or soldered joint 25. It will be observed that an identical spring bellows seal 26 is provided around the clamping member 16.

At their inner ends constituting abutment means the clamping members each is provided with suitable heating means, such as an electric resistor heater 27 shown in connection with the clamping member 15, and having terminals 28 extending from its outer end for connection to a suitable electrical supply source.

Also communicating with the chamber 13, as shown, through the upper wall is a pipe 29 leading through a valve 30 to a suitable vacuum pump 31, shown diagrammatically. Also, the pipe 29 is connected through a pipe 32 and a valve 33 to a tank 34 containing under pressure a supply of a suitable charging fluid which may be methyl chloride gas or sulphur dioxide gas.

In the sealing of the end of the tube 10 the first step is to insert the end into a bath of molten solder so as to apply a thin layer of solder 35 on the inner wall, and incidentally the outer wall, of the tube for a distance preferably somewhat greater than the outer length required for the formation of the seal. This solder preferably is composed of a conventional mixture of lead and tin.

The next step is to insert the end of the tube in the charging device and seal the charging device around the tube by turning the crank 18 and compressing the rubber bushing 17. With the valve 33 closed and the valve 30 open, the vacuum pump is then operated to exhaust thoroughly the air from the chamber 13, the tube and the bellows. Then the valve 30 is closed and valve 33 is opened to admit the charging fluid which fills the chamber 13, the tube 10 and the bellows 11.

The final step is the movement by suitable means of the clamping members 15 and 16 toward each other to compress the end of the tube and form a seal. Prior to this operation the clamping members are heated, as by suitable heating resistors 27 in each of the clamping devices, to a temperature high enough to liquefy thoroughly during the momentary compressing operation the coating 35 of solder, whereby the inner walls of the upper end of the tube which are compressed together are thoroughly united by a layer 36 (Fig. 4) of solder. Also, the outer surface of this sealed end is completely covered by a layer of solder including a mass 37 of solder filling the space between the uncompressed extreme ends of the walls, and forming a rounded end on the tube. In other words, the walls are compressed together a slight distance below the extreme end.

Preferably the inner ends of the clamping members are formed with complementary surfaces which actually compress one wall only of the tube against the other. In other words, as shown in Fig. 4, the clamping member 15 is provided with a semi-cylindrical groove 38 into which the adjacent side of the tube fits loosely when the clamping members are moved together. The other clamping member 16 is provided with a projection 39 which compresses the adjacent wall of the tube inward into substantially parallel relation with the opposite wall thus forming a depression 40 (Fig. 5) in the sealed end. After the tube has been compressed and the solder melted, the clamping members are withdrawn to the positions shown in Fig. 2 to provide for solidification of the solder in the compression chamber 13 while the fluid pressure is equalized on the inner and outer sides of the seal.

This seal has the great advantage that the inner walls of the tube, which are compressed together, are completely united together with the thin film of solder 36 (Fig. 4). When the solder is applied after the compression operation, it has been found impossible to flow the solder into and between the walls because of the higher fluid pressure inside the tube and leakage of gas out through small openings at the bends in the tube wall.

It will be understood that any suitable operating means can be used for moving the compression members 15 and 16 inward, these members being biased by the spring bellows 20 and 26 to their outermost positions, as shown in the drawing. For example, the plunger 15 can be moved inward by means of a cam 41 engaging the outer end of the plunger and mounted on a shaft 42 by means of which the cam 41 may be turned thereby to force the plunger member inward. A similar driving arrangement may be provided for the plunger 16. The two plungers are preferably simultaneously operated toward each other.

Obviously various other shapes may be used for the seal. The tubing may be compressed from each side to form a straight line seal between the two side walls. Also, the tubing may be compressed at more than two points, for example, at three points to provide three folds in the wall.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. Apparatus for charging a metal container including a tube having an end portion provided with a layer of solder on its inner wall, comprising walls forming a chamber, one of said walls being provided with an aperture through which the tube is inserted to a predetermined position in said chamber, fluid charging and pressure maintaining means connected to said chamber, compression means in said chamber for compressing together the walls of said end portion, and means for heating said end portion concurrently with the operation of said compression means to a temperature to melt said solder.

2. Apparatus for charging and sealing bellows temperature responsive devices including a metal tube having an end portion provided with a layer of solder on its inner wall, comprising walls forming a chamber, one of said walls being provided with an aperture through which the tube may be inserted to a predetermined position in said chamber, fluid charging and pressure maintaining means connected to said chamber, compression means in said chamber for compressing together the side walls of said end portion, and means for heating said compressing means to a temperature to melt said solder during said compressing operation.

3. Apparatus for charging and sealing bellows temperature responsive devices provided with a metal tube comprising walls forming a chamber, a first of said walls being provided with an aperture through which the tube may be inserted to a predetermined position in said chamber, an end portion on said tube being provided with a layer of solder on its inner wall, compression members in said chamber in position to compress between them the walls of said end portion together, means for heating the inner ends of said compression members to a temperature sufficient to melt said solder, means for evacuating the air from said chamber, means for charging said chamber and said temperature responsive device with a temperature responsive fluid at a pressure greater than atmospheric pressure, and means for moving said compression members inward thereby to compress together the walls of said end portion and melt said layer of solder while said fluid is maintained under pressure.

4. Apparatus for charging and sealing a bellows temperature responsive device provided with a tube, comprising walls forming a chamber, a first of said walls being provided with an aperture through which the tube may be inserted to a predetermined position in said chamber with an end portion of said tube between oppositely disposed second walls of said chamber, said oppositely disposed walls being provided with apertures, and said end portion being provided with a layer of solder on its inner wall, a compression member inserted in each of said apertures in said oppositely disposed walls in positions to compress between them the walls of said end portion together, fluid-tight sealing means between said compression members and said second walls and between said tube and said first wall, means for heating the inner ends of said compression members to a temperature sufficient to melt said solder, means for charging said chamber and said temperature responsive device with a temperature responsive fluid, and means for moving said compression members inward thereby to compress together between them the walls of said end portion and melt said layer of solder.

5. Apparatus for charging and sealing a temperature responsive device provided with a metal tube, comprising walls forming a chamber, a first of said walls being provided with an aperture through which the tube may be inserted to a predetermined position in said chamber with its end portion between oppositely disposed second walls of said chamber, abutment means on one of said second walls while the other of said second walls is provided with an aperture and said end portion being provided with a layer of solder on its inner wall, a compression member inserted in said aperture in said second wall in position to engage said end portion of said tube, fluid-tight sealing means between said compression member and said second wall and between said tube and said first wall, means for heating the inner end of said compression member, means for charging said chamber and said temperature responsive device with a temperature responsive fluid, and means for moving said compression member inward to bring its inner end into engagement with said end portion of said tube thereby to flatten said end portion against said abutment means and melt said layer of solder.

GEORGE L. McFARLAND, Jr.